United States Patent
Hoheisel et al.

[11] Patent Number: 6,131,252
[45] Date of Patent: Oct. 17, 2000

[54] CONNECTING ARRANGEMENT FOR THE EXHAUST GAS SYSTEM OF A MOTOR VEHICLE

[75] Inventors: Gerhard Hoheisel; Lutz Niemax, both of Wolfsburg; Thomas Kempernolte, Schoeningen, all of Germany

[73] Assignee: Volkswagen AG, Wolfsburg, Germany

[21] Appl. No.: 09/414,801

[22] Filed: Oct. 8, 1999

Related U.S. Application Data

[63] Continuation of application No. PCT/EP98/01461, Mar. 13, 1998.

[30] Foreign Application Priority Data

Apr. 9, 1997 [DE] Germany ............................ 197 14 700

[51] Int. Cl.[7] .............................. A44B 21/00; B42F 1/00; F16B 5/02
[52] U.S. Cl. .............................. 24/514; 24/525; 24/535; 24/569
[58] Field of Search .............................. 24/514, 525, 535, 24/72.5, 569, 522, 523

[56] References Cited

U.S. PATENT DOCUMENTS

| | | | |
|---|---|---|---|
| 526,490 | 9/1894 | Jessen | 24/72.5 |
| 1,920,899 | 8/1933 | Sullivan | 24/535 |
| 2,058,982 | 10/1936 | Hollingsworth | 24/535 |
| 2,062,685 | 12/1936 | Tinnerman | 24/535 |
| 2,461,256 | 2/1949 | Black | 24/525 |
| 2,479,634 | 8/1949 | Marques et al. | 24/514 |
| 4,074,491 | 2/1978 | Bell et al. | 52/394 |
| 4,646,395 | 3/1987 | Mayszak | 24/525 |
| 4,728,235 | 3/1988 | Patti | 411/174 |
| 5,339,500 | 8/1994 | Muller et al. | 24/514 |

FOREIGN PATENT DOCUMENTS

| | | |
|---|---|---|
| 0346237 | 6/1989 | European Pat. Off. . |
| 2945779 | 5/1980 | Germany . |
| 4228863 | 3/1994 | Germany . |
| 0014686 | 2/1910 | United Kingdom ..................... 24/514 |

*Primary Examiner*—Victor N. Sakran
*Attorney, Agent, or Firm*—BakerBotts L.L.P.

[57] ABSTRACT

A connecting arrangement for an exhaust gas system having two components, an exhaust gas system component which can be subjected to heat and a thermal shielding plate fitted beneath the exhaust gas system component and connected to it, including a connecting member arranged in such a way as to allow relative displacement of the exhaust gas system component and the thermal shielding plate in relation to each other as a result of differential thermal expansion behavior. The connecting member has sliding tongues with sliding surfaces for slidably engaging a first component with a predetermined spring force. Furthermore, the connecting member is rigidly connected to the second component and threaded clamping members make it possible to fix the second component onto the connecting member and to brace the connecting member with the first component.

10 Claims, 5 Drawing Sheets

CONNECTING ARRANGEMENT FOR THE EXHAUST GAS SYSTEM OF A MOTOR VEHICLE

REFERENCE TO RELATED APPLICATION

This application is a continuation of International Application No. PCT/EP98/01461 filed Mar. 13, 1998.

BACKGROUND OF THE INVENTION

This invention relates to connecting arrangements for exhaust gas systems in motor vehicles.

Since motor vehicle exhaust gas systems, and particularly the catalytic converter of an exhaust gas system, may become very hot in operation, a heat shield pate is usually mounted under the exhaust gas system or the catalytic converter to prevent, at least to a large extent, excessive application of heat to the roadway together with the consequent hazards. Because the exhaust gas system, and specifically the converter, may have a wide range of temperatures, a corresponding compensation of lengths between the exhaust gas system with the catalytic converter and the heat shield plate in the longitudinal direction of the vehicle must be permitted.

For this purpose, various connecting devices including sliding seats have been employed in the past in which one of the components, i.e. the heat shield plate or a component of the exhaust gas system, is connected to a slide which is displaceable with clearance in the longitudinal direction of the vehicle in a slide track part of the sliding seat. The other component is connected to a sliding seat housing forming a guide for the slide so that relative displaceability of the two components with respect to each other is maintained because of the displaceability of the slide within the sliding seat housing. A disadvantage of such arrangements of two components with a sliding seat, however, is that a sliding seat consisting of a housing, an inserted slide and a tightening screw is comparatively costly and expensive to produce. Furthermore, proper guidance of the slide in the guide throughout the high-temperature range to which the sliding seat is subjected is uncertain.

German Offenlengungsschrift No. 42 28 511 and U.S. Pat. No. 5,339,500 describe holding clamps for connecting plates having unlike expansion behaviors, in which two clamp legs are connected by a resilient intermediate portion and through holes are provided in the legs, through which a screw can be passed, so that the two clamp legs are pressed together toward stops against the resilient spring action of the intermediate portion. The clamp legs are each provided with anterior and posterior spring tabs having a spacing in their relaxed condition which is less than the thickness of the plate to be clamped. This holding clamp arrangement connects plates having different expansion behaviors, especially in automobile construction for fastening plastic housings or baffles to body parts. With a screw inserted in the clamp and tightened, the spring tabs engage the plates under some tension, and permit a relaxation in the thickness direction upon thinning of the plate resulting from the action of heat so that secure retention of the thinned plate continues to be possible. The clamping force of the spring tabs is selected so that lateral displacement of the clamped plate due to expansion is possible.

However, the configuration of the connecting arrangement according to U.S. Pat. No. 5,339,500 is not optimal. The threaded part of that arrangement is configured as an integral part of the connecting device, namely as part of a leg bent in a U-shape. Consequently, in the first place the bottom part of the connecting device requires more space and in the second place the connecting device cannot be adapted in use by the mechanic.

SUMMARY OF THE INVENTION

Accordingly, it is an object of the invention to provide a connecting arrangement for the exhaust gas system of a motor vehicle which overcomes disadvantages of the prior art.

Another object of the invention, is to provide a connecting arrangement which assures a secure and dependable connection between an exhaust gas system component and a heat shield plate which is simple and economical to produce and which permits adaptation by the mechanic in use.

These and other objects of the invention are attained by providing a connecting arrangement having a connecting member with two clamp legs resiliently connected to each other and a threaded part connectable to one clamp leg by way of a catch connection so that a screw inserted through a hole in the other clamp leg can be threaded into the threaded part.

According to the invention, therefore, the threaded part can be separable from the connecting member or, if required, the threaded part can be connected to the connecting member by the corresponding catch connection. In contrast with the connecting arrangement of U.S. Pat. No. 5,339,500, firstly the space required by the connecting arrangement according to the invention is less, since the bottom portion of the connecting member requires only the width of the threaded part itself, and does not require any additional space for the correspondingly bent leg. Another substantial advantage is in the adaptability of the connecting arrangement according to the invention since, with threaded part detached from the connecting member, a simple stockkeeping of connecting members and threaded parts is possible. Moreover, since the threaded part is independently attachable to the connecting member, the mechanic may fasten the threaded part to the connecting member separately in places of difficult access. Specifically, the mechanic can decide whether to connect the threaded part to the connecting members at the intended site of assembly before installing the connection. This handling of the connecting arrangement according to the invention is much simpler and more flexible for the mechanic.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
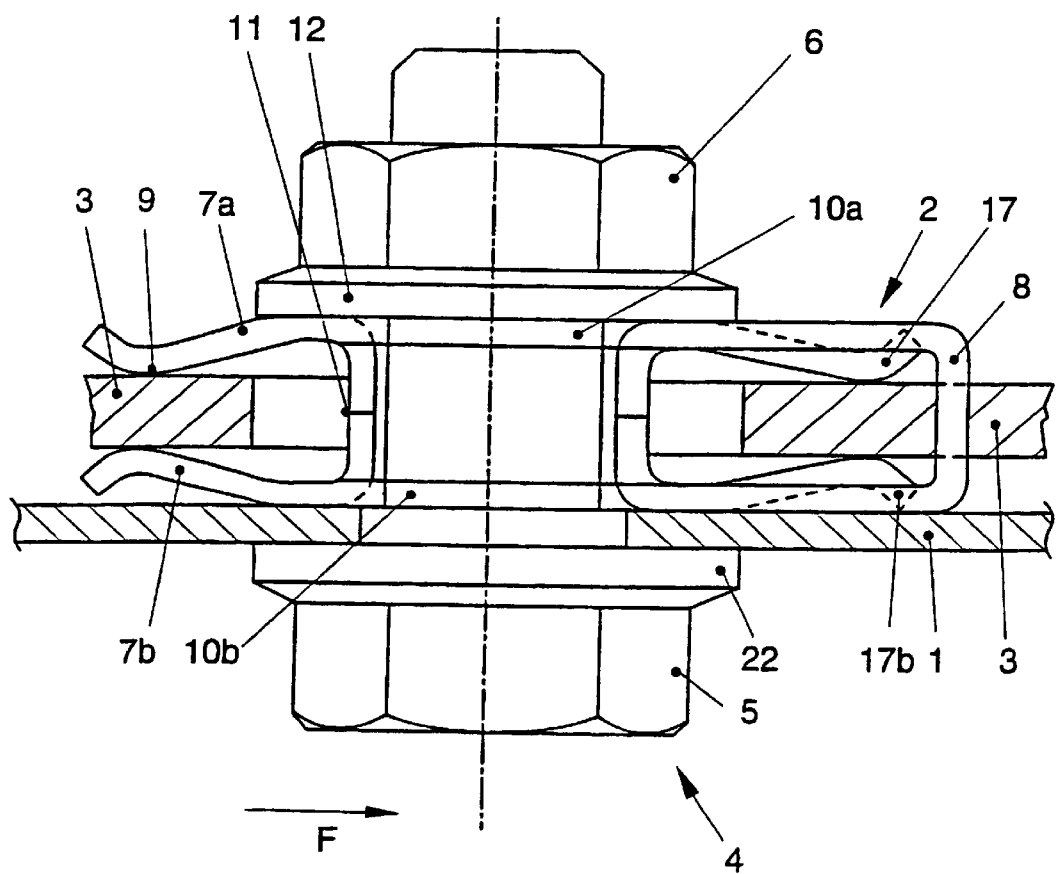
FIG. 1 is a side view illustrating a representative embodiment of a connecting arrangement having a threaded part in the form of a nut and which is not connectable by a catch connection to the clamp leg.
Figure 2:
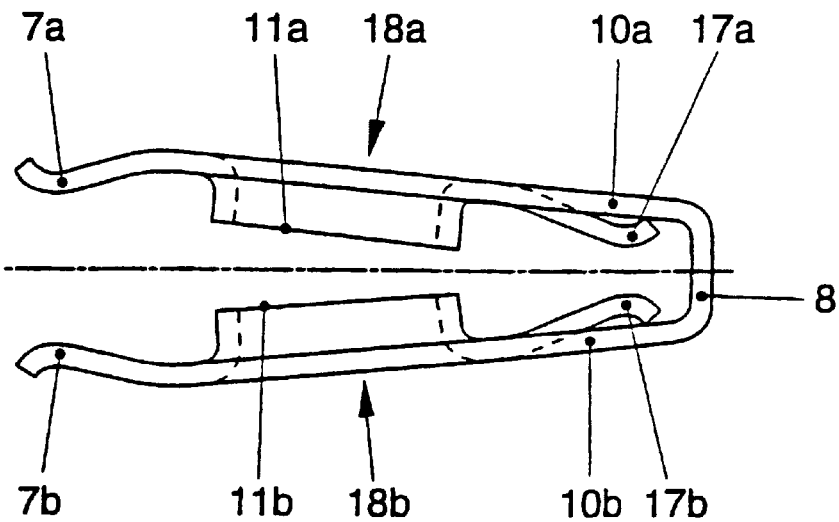
FIG. 2 is a side view illustrating the connecting arrangement of FIG. 1 in the relaxed condition.
Figure 3:
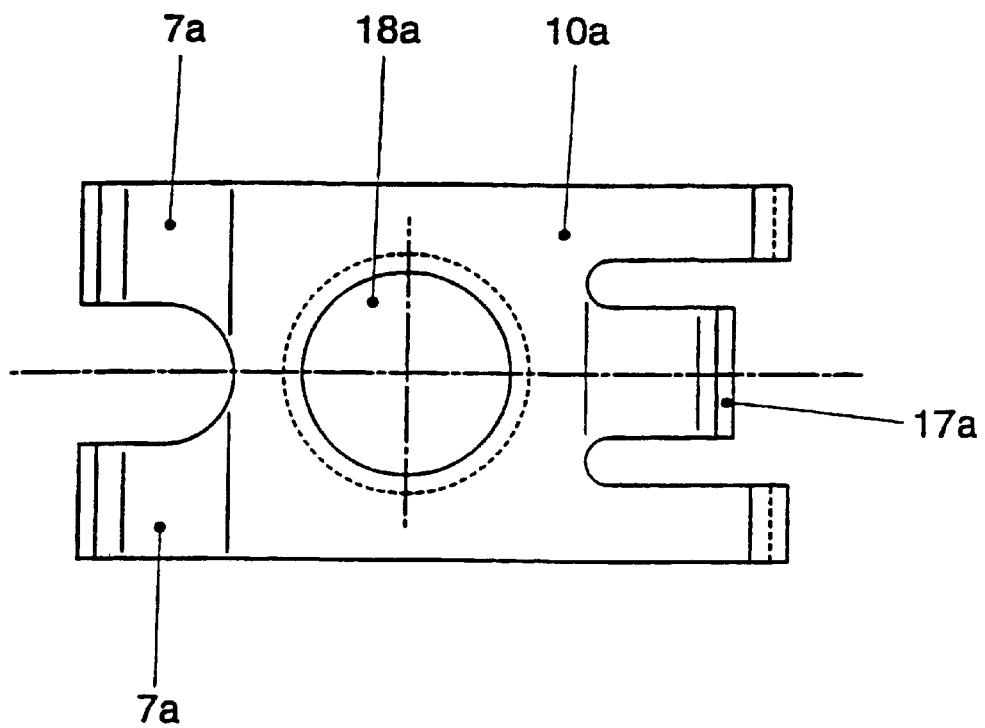
FIG. 3 is a top view of the connecting arrangement of FIG. 2.

In the typical embodiment of the invention shown in FIGS. 1–3 a connecting arrangement for an exhaust gas system includes a heat shield plate 1 and a catalytic converter or catalyst suspension 3 for the exhaust gas system which are connected to each other by a sliding seat 2 serving as a connecting member. The sliding seat 2 has two clamp legs 10a and 10b connected to each other by an intermediate portion 8 which provides a resilient connection between them. On the front side of the two clamp legs 10a and 10b shown at the left in FIG. 1, and at the rear side, shown at the right in FIG. 1, two upper slide tabs 7a and 17a and two lower slide tabs 7b and 17b are provided, respectively.

The clamp legs 10a and 10b each have through holes to receive a screw 5 having a head 12, and a nut 6 is held against the other side of the sliding seat by the screw so as to press the clamp legs 10a and 10b together against corresponding stops 11a and 11b. The screw 5 passes through the through holes in the legs and through an oblong hole 16 in the suspension 3.

Since the spacings between the slide tabs 7a and 7b and between the slide tabs 17a and 17b, with the clamp legs 10a and 10b pressed together against stops 11a and 11b is less than the actual thickness of the suspension 3, the suspension is clamped by the tabs 7a, 7b, 17a, and 17b in the region of the slide surfaces 9 of the tabs with a corresponding clamping force.

The sliding travel of the sliding seat in the longitudinal direction of the vehicle, as indicated by an arrow F (the direction of vehicle motion) is limited by the difference between the diameter of the oblong hole 16 and the radial diameter of the sliding seat in the region of the stops 11a and 11b.

The screw head 12 engages the clamp leg 10a, while a washer 22 on the nut 6 engages the heat shield plate 1 and presses it against the clamp leg 10b.

Figure 4:
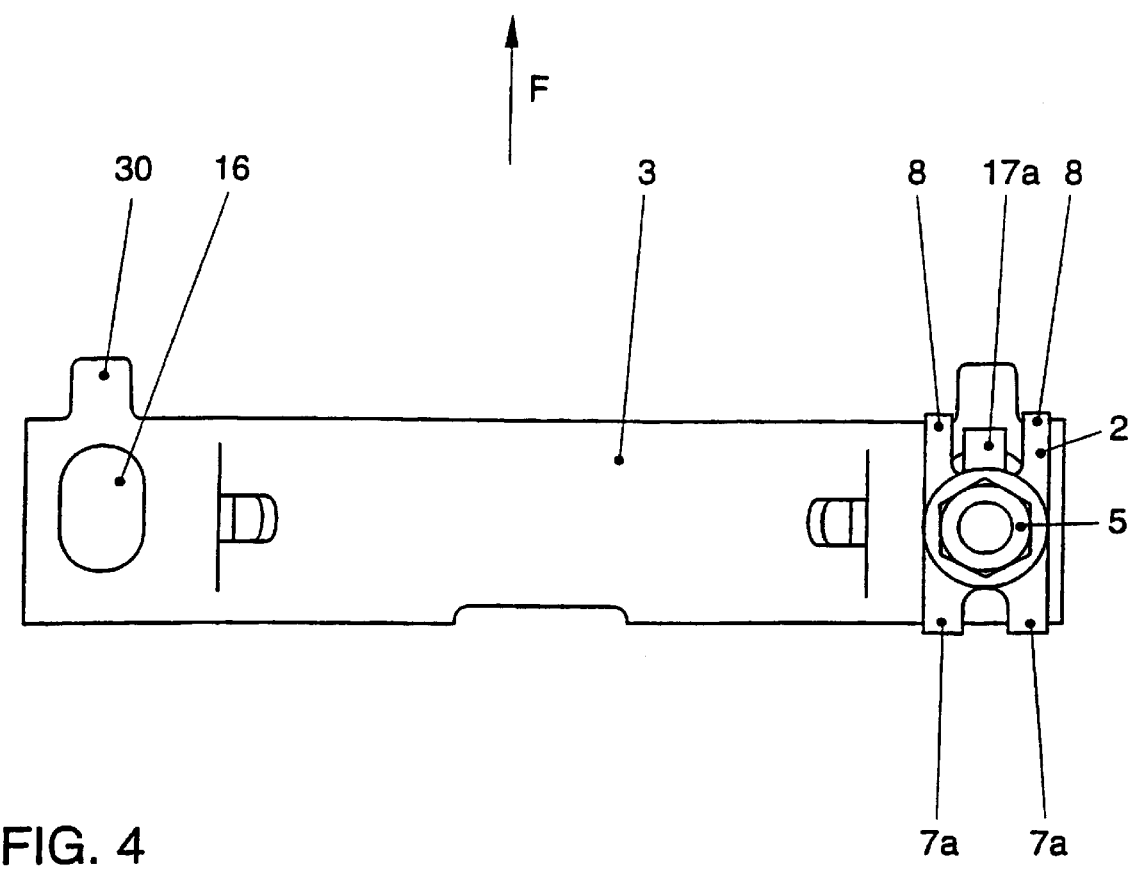
FIG. 4 is a top view of a suspension utilizing a connecting arrangement according to FIGS. 1–3.

FIG. 4 shows a suspension 3 capable of being connected to the heat shield plate by sliding seats at both ends, only a sliding seat 2 being shown at the right-hand end for the sake of clarity. To permit displaceability of the sliding seat in the longitudinal direction of the vehicle on the suspension over the entire sliding travel and yet prevent rotation of the sliding seat, for example during turning of the screw or due to transverse forces, a lug 30 is formed on the suspension 3. The lug permits sufficient sliding travel for the tabs 17a and 17b but blocks any excessive transverse motion of the two intermediate portions 8 on the left and right of the tabs 17a and 17b, so that they cannot be turned past the lug 30 even if the sliding seat is pushed all the way toward the lug i.e., into the position shown at the top in FIG. 4.

With this arrangement, different expansions of the exhaust gas system components due to temperature can be compensated.

The sliding seat may accommodate relative motions, which may amount to as much as 3 mm between the two components, in particular steel components, due to small, well-defined longitudinal forces resulting from different temperatures acting on the heat shield plate (about 300° C.) and on the catalyst (about 850° C.).

Figure 5:
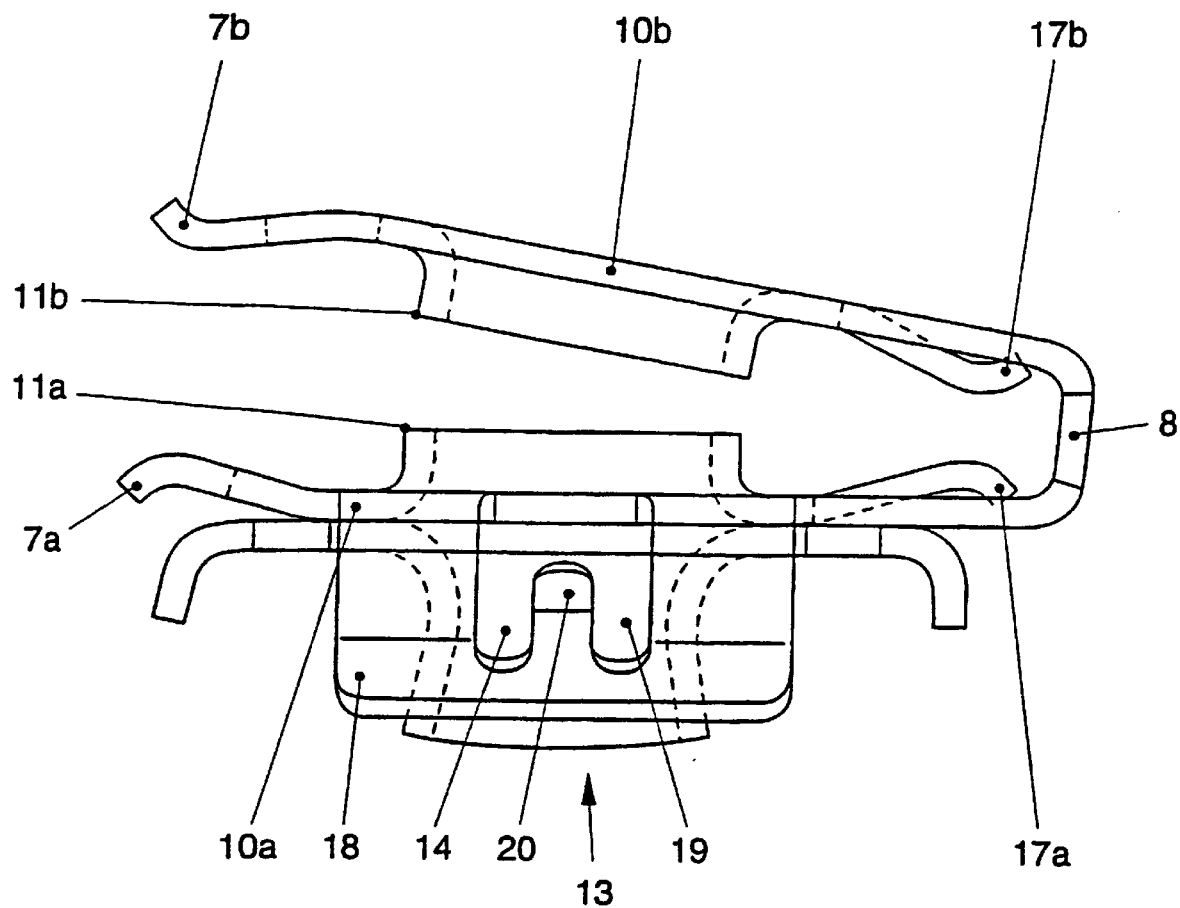
FIG. 5 is a side view showing another embodiment of a connecting arrangement according to the invention.
Figure 6:
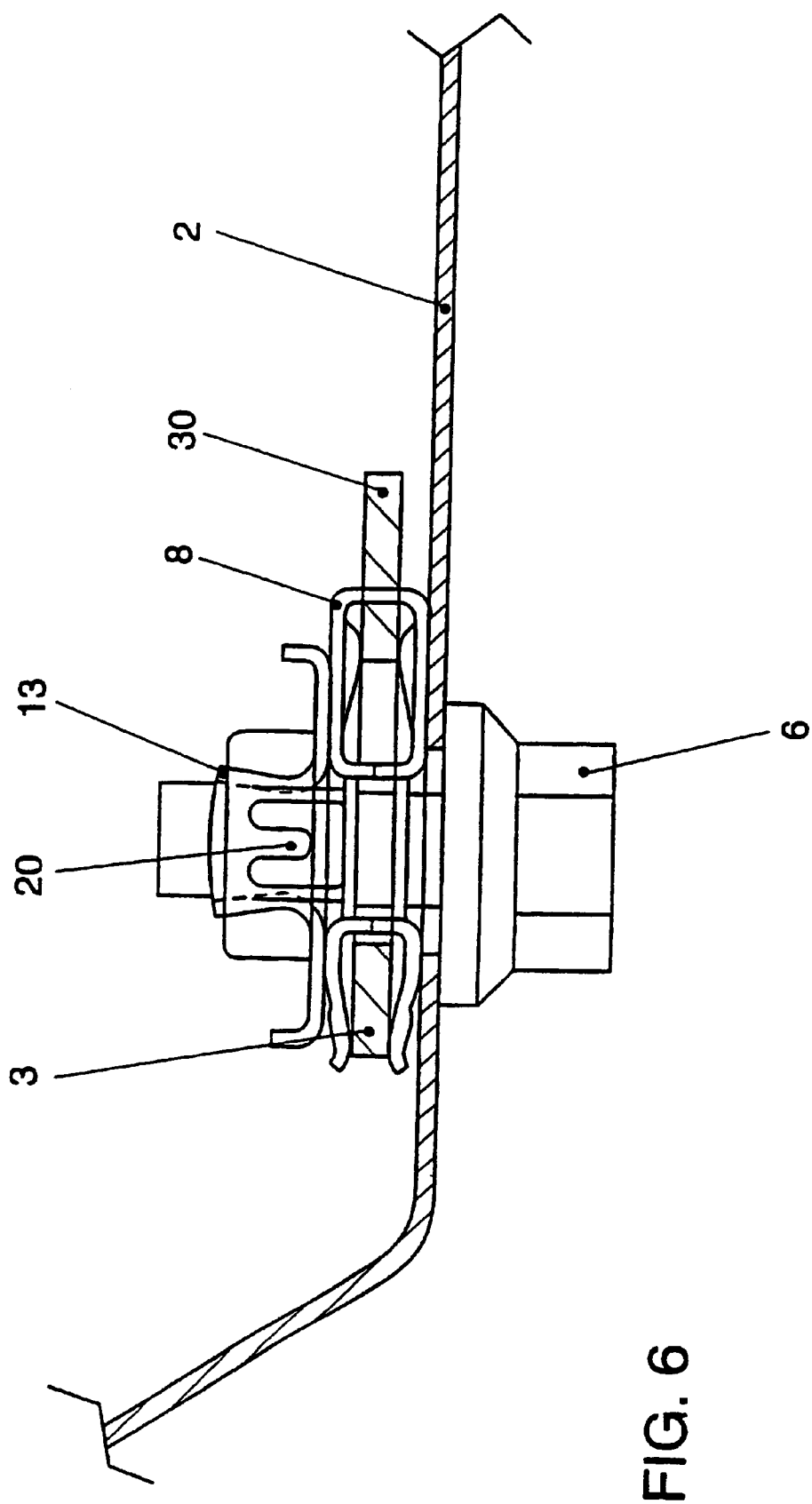
FIG. 6 illustrates a component for an exhaust gas system with a connecting arrangement according to the invention.

In the connecting arrangement 2 according to the invention shown in FIG. 5, the nut is replaced by a threaded part 13 connected by a catch 14 to the bottom clamp leg 10a. The catch 14 consists of two links 18 extending laterally down from the sliding seat, each link having a horseshoe-shaped window 19 in which lugs 20 are cut. The lugs 20 are capable of being bent toward the center of the sliding seat to control the extent of axial play between the threaded part 13 and the sliding seat. In accordance with the invention, the screw is introduced into the through hole of the clamp leg 10b from the top as seen in FIG. 5 and screwed into the threaded part 13 without requiring a nut to be held against the other side. Therefore, a simple attachment of a component from one side, or assembly of a component covered by a heat shield plate on the other side, for example, is made possible.

To assemble the connecting arrangement, first the suspension 3 of the catalytic converter is placed in the region between the clamp legs 10a and 10b, and then a screw is passed through the holes in the legs and engaged with a nut 6 or a threaded part 13 until the stops 11a and 11b of the two legs 10a and 10b abut each other. In this way, the heat shield plate 1 is fixed between the screw head or washer 22 and the clamp leg 10b.

By providing a broad, rounded configuration of the slide tabs 7a, 7b, and 17a, 17b, a long service life can be assured, whereas narrow tabs tends to dig into the suspension, increasing the required sliding force, possibly to the point of failure of the device.

Although the invention has been described herein with reference to specific embodiments, many modifications and variations therein will readily occur to those skilled in the art. Accordingly, all such variations and modifications are included within the intended scope of the invention.

What is claimed is:

1. A connecting arrangement for an exhaust gas system comprising a first component and a second component to be connected to each other so that the components are displaceable relative to each other as a result of different heat expansion behavior, one of the first and second components being an exhaust gas unit subjected to high temperatures during operation and the other of the first and second components being a sheet metal heat shield beneath the exhaust gas unit; the connecting arrangement comprising:

a connecting member provided with slide tabs having slide surfaces for slidable clamping engagement with a first component and having two clamp legs resiliently connected to each other by an intermediate portion, the slide tabs engaging the first component with a predetermined spring pressure to permit relative sliding motion of the first component in the horizontal direction and the second component being rigidly affixed to the connecting member;

the clamp legs including stops which abut each other when the clamp legs are closed; and the second component having an oblong opening in which the connecting member is displaceable during relative motion of the first and second components, the extent of the displacement being limited by the difference between the dimension of the oblong opening in the direction of relative displacement and the corresponding dimension of the connecting member in the region of the stops.

2. A connecting arrangement according to claim 1 including a lug on the second component extending in the direction of relative displacement and forming a displacement path for the slide tabs of the connecting member and wherein an intermediate portion of the connecting member is arranged adjacent to the lug in such manner that a range of angular rotation of the intermediate portion is fixed by the lug.

3. A connecting arrangement according to claim 1 wherein one of the first and second components of the exhaust gas system is a catalytic converter or a catalyst.

4. A connecting arrangement according to claim 3 wherein the catalytic converter or catalyst is connected to the sheet metal heat shield by a support member clamped by the connecting member.

5. A connecting arrangement according to claim 4 wherein the sheet metal heat shield is slidably accommodated by the slide tabs as the first component.

6. A connecting arrangement according to claim 3 wherein the catalytic converter or catalyst is connected to the heat shield by a suspension member.

7. A connecting arrangement according to claim 1 including a screw extending through openings in the clamp legs and a threaded member cooperating with the screw to hold the clamp legs together.

8. A connecting arrangement according to claim 7 wherein the threaded member is secured to the connecting member.

9. A connecting arrangement according to claim 8 wherein the threaded member is secured to the connecting member by holding tabs providing play.

10. A connecting arrangement according to claim 1 wherein the sheet metal heat shield is slidably received by the slide tabs.

* * * * *